United States Patent Office 3,356,521
Patented Dec. 5, 1967

3,356,521
ELECTROSTATIC FLOCKING PROCESS USING MODIFIED STEREOREGULAR POLYPROPYLENE FIBERS
Alexander Boltniew, Spartanburg, S.C., assignor to Hercules Incorporated, a corporation of Delaware
No Drawing. Filed Sept. 17, 1964, Ser. No. 397,310
3 Claims. (Cl. 117—17)

ABSTRACT OF THE DISCLOSURE

Stereoregular polypropylene fibers are made amenable to flocking by electrostatic means by incorporating a small amount of either $TiO_2$ or $ZnS$ into the polymer prior to spinning.

---

This invention relates to a process of forming flocked articles with stereoregular polypropylene fibers. More specifically, it relates to an electrostatic method of flocking the polypropylene fibers.

A flocked article is one in which a multiplicity of short fibers are embedded securely and permanently in an adhesive applied to a substrate and are caused to stand on end to form a dense, thick pile on the surface. The flocked article is frequently a fabric, such as an artificial fur, a window channel fabric, e.g., for an automobile, a velvet fabric, or a carpet. However, the flocked article is not always a fabric, as the flocking fibers can be applied to virtually any type of substrate. The method is frequently used to apply printing or advertising indicia to paper or metal foil or other non-fabric substrata. The method of this invention is useful in all such applications where a flocking process is currently used.

In a well-known technique for forming flocked articles, the flocking fibers, usually referred to simply as "flock," are supplied to a sifting hopper disposed above a substrate coated with an uncured adhesive. The flock comprises extremely short segments of an antistatically treated yarn. An electrostatic field of predetermined strength is created between the substrate and the hopper. The hopper is provided with rotating brushes or similar means to propel the fibers through the sifting screen. As the fibers pass through the screen, they move into the electrostatic field. The electrostatic force acting on the fibers tends to push them apart and align them along the force lines of the field. They are drawn by gravity and by the opposite polarity of the substrate, toward the substrate. The fibers strike the substrate like a dart and lodge in the adhesive. Thereafter the adhesive is cured to secure the flocking permanently therein.

The electrostatic method outlined is applicable in general with most fibers, both natural and synthetic. For instance, the method has been successfully applied to polyester, nylon, and polyacrylic fibers, among the synthetics, as well as to wool and cotton. All of the fibers named, however, have a certain degree of polarity inherent in their structure due to the presence of various organic functional groups. This inherent polarity causes the fibers to be susceptible to polarization sufficient to cause them to align themselves in the electrostatic field and to be attracted to the oppositely charged substrate to form the desired flocked article.

However, in practice, it has not been found possible to apply the electrostatic method satisfactorily to flocking with fibers made from stereoregular polypropylene, sometimes referred to as isotactic polypropylene. This is undoubtedly due to the fact that because of its unique structure, which resembles that of a virtually totally saturated hydrocarbon, there is little or no inherent polarity in the polypropylene molecule.

Now, in accordance with the present invention, a method has been found by which flocked articles can be prepared wherein the flock comprises polypropylene fibers. This method comprises incorporating into the polypropylene, prior to spinning into fibers, 0.5 to 2.0% of a polar inorganic salt selected from the group consisting of titanium dioxide and zinc sulfide.

The inorganic salt can be incorporated into the polypropylene in any convenient manner. For instance, a dry powder of the salt can be incorporated into a batch of polypropylene molding powder and thoroughly dry blended. The molding powder is then melted in a compounding extruder which melts the polymer and thoroughly, homogeneously mixes the polymer and additive. Alternatively, the molding powder can be treated with a solution of the salt, mixed thoroughly to obtain relatively uniform distribution of the salt throughout the mass of the polymer and the solvent evaporated depositing the salt upon the surface of the polymer particles. Upon melting the polymer in the extruder as before, the salt becomes relatively homogeneously mixed throughout the polymer mass. The salt can also be incorporated by use of a paint mill or similar roll mill.

The polymer containing the inorganic salt is extruded into fibers which are then cold drawn and an antistatic solution is applied to the surface thereof. These steps are performed in the manner customarily employed in the preparation of polypropylene fibers, and are well known to those skilled in the fiber art. The yarn is then reduced to flock ranging from about 700 to 15,000 microns in length. For the best and most uniform flocking characteristics, it is desirable that the flock be of substantially uniform length and diameter. The flock is then applied to the adhesive coated substrate in the manner previously described.

The antistatic agent to be employed can be any of the known antistatic compounds normally employed with synthetic fibers, such as the quaternary amine salts and the polyalkylene glycol ethers. The quaternary amine salts are particularly effective antistatic materials. These are represented by the general formula:

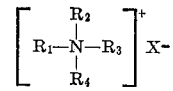

where $R_1$, $R_2$, $R_3$, and $R_4$ are the same or different organic radicals and $X^-$ is an inorganic ion such as halide, sulfate, nitrate, or the like. Exemplary, but not all-inclusive, of such compounds are those disclosed in U.S. Patents 3,118,784, 3,121,091, and 3,117,113. The antistatic compound is normally applied from an aqueous solution by known methods.

The adhesive can be any of a wide variety of heat curing, firmly bonding compositions. The properties to be sought in the adhesive will, of course, depend upon the nature of the product being prepared. In general, the adhesive should be one which bonds firmly to the flock and to the substrate but which remains flexible after curing. When the finished product is to be a fabric, as, for instance, a velvet material, it is also preferable that the cured adhesive have considerable resistance to water, detergents, and dry cleaning solvents.

The uncured properties of the adhesive are somewhat more critical than its cured properties. It should possess the proper viscosity so that it can engage the flocking fiber and hold it in the proper position until the adhesive has cured. It should be relatively resistant to curing at room temperatures to allow application of flock, but easy to cure at elevated temperature in relatively short time for the sake of economy.

The adhesive is usually applied to the entire surface of the substrate to yield a completely flocked surface. However, it can also be applied to predetermined selected areas only, to form designs or printing on the surface.

The flocking characteristics of the $TiO_2$ and $ZnS$ containing polypropylene flock are illustrated by the examples in the following table in which percentages of $TiO_2$ and $ZnS$ added to the yarn before spinning are given in percentages by weight. Subsequent to spinning, the yarn was treated with an aqueous solution of 1% by weight of quaternary amine salt antistatic agent ("Electrosol D") and 3% by weight of sodium chloride to give a dry pick-up of 0.5 g. of antistatic agent and 1.5 g. of sodium chloride per 100 g. of yarn. The flock used in the examples was prepared by cutting skeins of the treated continuous filament polypropylene yarn (composed of 210 filaments of 30 denier per filament) into flock having an average length of 3000 microns.

The flocking was accomplished by means of a radio frequency type DC power supply designed to deliver 25,000 volts DC at about 0.5 milliamps, using a 110 volt AC, 60 cycle source. One terminal of the DC power supply was connected to a metal sifter into which the flocking was placed. The sifter was equipped with a rotatable blade for forcing the flocking through the sifting screen and was adapted to be shaken when necessary.

The other terminal of the DC power supply was attached to a metal plate disposed directly beneath the sifter. A length of fabric coated with a heat curing adhesive upon which the flocking was to be deposited was placed on the metal plate. An electrostatic field was thus created between the sifter and the fabric.

The flock was forced through the sifter by the action of the rotating blades and the shaking of the sifter. Upon entering the electrostatic field, the individual fibers received a charge which tended to push them apart and align them along the force lines of the electrostatic field. In the usual manner, the charge on each fiber, attempting to leak off, tended to accumulate preferentially at one end of the fiber, causing that end to accelerate more rapidly than the other. This resulted in the fibers falling in substantially a vertical drop, with their long axis perpendicular to the long axis of the backing fabric. The falling fibers struck the fabric like darts, and embedded themselves in the adhesive. Upon striking the fabric, the fibers immediately reversed polarity, causing them to be attracted back toward the sifter. The fibers which were firmly anchored in the adhesive were thus caused to stand erect throughout the remainder of the flocking procedure. The fibers which did not adhere firmly to the adhesive, influenced by the attraction of the oppositely charged screen, moved back toward the screen where they again reversed polarity and moved downward again toward the fabric. This process was repeated until all the fibers were lodged in the adhesive or had escaped from the influence of the field.

The characteristics of the polypropylene flock were qualitatively evaluated by means of its siftability, its activity, and its flockability. By siftability is meant the ability of the fibers to separate one from the other and flow through the sifter into the electrostatic field. The activity is a measure of the velocity of the fiber in the electrostatic field and the rate at which it can reverse its polarity in the field. Flockability is a measure of the density and erectness of the flock after deposition upon the substrate. Flockability is the most critical parameter and depends to a large extent upon the other two parameters.

The activity and siftability of the flocking were noted by visual observation. Siftability was evaluated by noting the efficiency with which the rotating blade was able to push the flock through the sifter screen. Activity was evaluated by noting visually the mobility of the flock in the electrostatic field. When the fabric appeared to be thoroughly covered with the flock, the adhesive was cured in a forced draft oven. The cured specimen was vacuum cleaned to remove any residual, unadhered fibers and the flockability was evaluated by the visual comparison of the density of coverage of the fabric and the erectness of the flock on the fabric. Ratings were assigned as noted below.

TABLE 1

| Example No. | Additive | Siftability | Activity | Flockability |
|---|---|---|---|---|
| 1 | None | 1 | 1 | 1 |
| 2 | 0.5% $TiO_2$ | 4 | 4 | 2-3 |
| 3 | 1.0% $TiO_2$ | 4 | 4 | 3 |
| 4 | 1.5% $TiO_2$ | 4 | 4 | 3-4 |
| 5 | 2.0% $TiO_2$ | 4 | 4 | 4 |
| 6 | 0.5% ZnS | 3 | 3 | 3 |
| 7 | 1.0% ZnS | 4 | 3-4 | 3 |
| 8 | 1.5% ZnS | 4 | 4 | 3-4 |
| 9 | 2.0% ZnS | 4 | 4 | 3-4 |

1=Poor; 2=Good; 3=Very Good; 4=Excellent.

The improved flockability of the fibers resulting from the incorporation of the inorganic salt of this invention is clearly apparent from the data presented in the table.

What I claim and desire to protect by Letters Patent is:

1. In the process of electrostatically flocking fibers of stereoregular polypropylene wherein anti-static treated yarn fiber flock is sifted onto and adhesive coated substrate in the presence of an electrostatic force field between the sifting means and the substrate, the improvement which comprises using stereoregular polypropylene flocking fibers prepared by incorporating into the polypropylene, prior to spinning into fibers, 0.5 to 2.0 percent by weight of a polar inorganic salt selected from the group consisting of titanium dioxide and zinc sulfide.

2. The process of claim 1 where the polar inorganic salt is zinc sulfide.

3. The process of claim 1 where the polar inorganic salt is titanium dioxide.

References Cited

UNITED STATES PATENTS

| | | | |
|---|---|---|---|
| 2,717,877 | 9/1955 | Vitalis | 252—8.7 |
| 2,731,435 | 1/1956 | Johnson et al. | 260—41 |
| 2,805,959 | 9/1957 | Ewing | 117—17 |
| 3,029,160 | 4/1962 | Van Der Beck | 117—17 |
| 3,078,250 | 2/1963 | Thompson | 260—41 |
| 3,137,672 | 6/1964 | Lehane | 260—41 |
| 3,166,608 | 1/1965 | Natta et al. | 117—138.8 X |
| 3,183,202 | 5/1965 | Baird et al. | 117—138.8 X |
| 3,203,821 | 8/1965 | Domin | 117—17 |
| 3,249,575 | 5/1966 | Engle | 260—41 X |
| 3,275,487 | 9/1966 | Lemelson | 117—17 X |

FOREIGN PATENTS 940,028   10/1963   Great Britain.

WILLIAM D. MARTIN, *Primary Examiner.*

E. J. CABIC, *Assistant Examiner.*